Patented Jan. 31, 1950

2,495,735

UNITED STATES PATENT OFFICE 2,495,735

PROCESS FOR PREPARING LOWER ALKYL ESTERS OF 3 - HYDROXY - 11-KETO-12-BROMONORCHOLANIC ACID

Edward C. Kendall, Rochester, Minn., assignor to Research Corporation, New York, N. Y., a corporation of New York No Drawing. Application February 19, 1947, Serial No. 729,668

2 Claims. (Cl. 260—397.1)

This invention relates to a process for the preparation of lower alkyl esters, e. g. the methyl ester of 3-hydroxy-11-keto-12-bromonorcholanic acid from the corresponding 3,9-epoxy-11-ketonorcholanates. The invention is illustrated by the following example.

*Preparation of methyl 3-hydroxy-11-keto-12-bromonorcholanate from methyl 3,9-epoxy-11-ketonorcholanate.*—20.00 g. (0.0515 M.) of methyl 3,9-epoxy-11-ketonorcholanate are placed in a 200 cc. glass pressure tube or bottle and dissolved in 25 cc. of dry alcohol-free chloroform. 25 cc. of acetic anhydride are added, the solution is cooled in a dry ice-acetone bath and 100 g. of dry hydrogen bromide are passed into the reaction mixture. The container is sealed at —78° and allowed to stand in an ice pack at 0° for 25 hours. It is then cooled again in a dry ice bath, opened, and its contents poured into a beaker which contains chipped ice. The ice is allowed to melt and during an interval of 1 to 2 hours the acetic anhydride is decomposed. About 125 cc. of chloroform are added, the aqueous layer is separated and the chloroform layer is washed twice with water. The chloroform is dried over anhydrous sodium sulfate, filtered and diluted with 100 cc. of methanol. 5 cc. of acetyl chloride are introduced and after about one hour 150 cc. of methanol are added. The solution is allowed to stand at room temperature 18 to 24 hours. The solution is diluted with a large volume of water and the chloroform layer is separated. The aqueous phase is washed once with ether, and the combined organic layers washed with dilute aqueous sodium hydroxide, saturated aqueous sodium chloride, and finally filtered through anhydrous sodium sulfate. The solution is concentrated to a small volume on the steam bath and diluted with petroleum ether to cause separation of crystals. Additional crops of crystals may be obtained by concentrating and further diluting with petroleum ether. Following is the yield obtained in the above experiment:

Crop 1: Yield 17.96 g.  M. P. 155–156°
Crop 2: Yield  2.50 g.  M. P. 151–154°
Crop 3: Yield  0.54 g.  M. P. 150–153°

21.00 g. (87% theory).

In the above described process I have found it to be advisable to add only a portion of the 150 cc. of methanol with the 5 cc. of acetyl chloride and then after the reaction has proceeded for about one hour to add the remainder of it. This procedure avoids crystallization which may occur if the methanol is added all at once.

The product, methyl 3-hydroxy-11-keto-12-bromonorcholanate, is a stable compound. The difference between the yield of 87% and 100% probably is unchanged starting material, a small amount of 3,12-dibromo-11-ketonorcholanic acid or its methyl ester, and a small amount of decomposition products.

The bromine atom is in position 12. For proof of this see Journal of Biological Chemistry, volume 166, pages 345 to 365, November 1946.

I claim:

1. The process comprising reacting a compound of the formula:

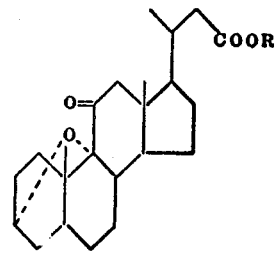

wherein R is a lower alkyl group with hydrobromic acid and recovering a compound of the formula

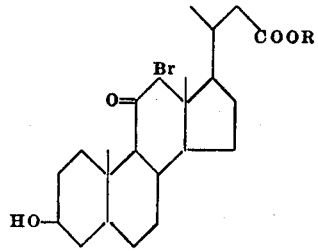

2. Process as defined in claim 1 in which R is the methyl group.

EDWARD C. KENDALL.

REFERENCES CITED

The following references are of record in the file of this patent:

UNITED STATES PATENTS

| Number | Name | Date |
|---|---|---|
| 2,313,732 | Butenandt | Mar. 16, 1943 |
| 2,321,690 | Logemann | June 15, 1943 |
| 2,376,708 | Marker | May 22, 1945 |
| 2,387,706 | Reichstein | Oct. 23, 1945 |

OTHER REFERENCES

Lardon: Helv. Chim. Acta 28, 1420–1426 (1945).